US012412691B2

(12) United States Patent
Sarkin et al.

(10) Patent No.: US 12,412,691 B2
(45) Date of Patent: Sep. 9, 2025

(54) METHOD AND APPARATUS HAVING A SINGLE COIL WITH EMBEDDED MAGNETS

(71) Applicant: G.W. Lisk Company, Inc., Clifton Springs, NY (US)

(72) Inventors: Nathan M. Sarkin, Farmington, NY (US); Erik T. Karlsen, Romulus, NY (US)

(73) Assignee: G.W. Lisk Company, Inc., Clifton Springs, NY (US)

( * ) Notice: Subject to any disclaimer, the term of this patent is extended or adjusted under 35 U.S.C. 154(b) by 146 days.

(21) Appl. No.: 18/024,165

(22) PCT Filed: Apr. 5, 2021

(86) PCT No.: PCT/US2021/025702
§ 371 (c)(1),
(2) Date: Mar. 1, 2023

(87) PCT Pub. No.: WO2022/071988
PCT Pub. Date: Apr. 7, 2022

(65) Prior Publication Data

US 2023/0268110 A1 Aug. 24, 2023

Related U.S. Application Data

(60) Provisional application No. 63/086,123, filed on Oct. 1, 2020.

(51) Int. Cl.

| | |
|---|---|
| ***H01F 7/08*** | (2006.01) |
| ***H01F 7/16*** | (2006.01) |
| ***H01F 27/28*** | (2006.01) |

(52) U.S. Cl.
CPC .......... *H01F 7/081* (2013.01); *H01F 7/1607* (2013.01); *H01F 27/28* (2013.01)

(58) Field of Classification Search
CPC ........ H01F 7/081; H01F 7/1607; H01F 27/28; H01F 7/1615; H01F 2007/085
(Continued)

(56) References Cited

U.S. PATENT DOCUMENTS 3,040,217 A * 6/1962 Conrad ................ H01F 7/1615 335/254
3,338,140 A 8/1967 Sheesley
(Continued)

FOREIGN PATENT DOCUMENTS

CN 101013841 A 8/2007
CN 201547322 U 8/2010
(Continued)

OTHER PUBLICATIONS

Mahmoodi (Nov. 2018) "Scotch-Yoke Quarter Turn Actuator," ResearchGate GmbH Retrieved from the internet: <url:https://www.researchgate.net/figure/Scotch-Yoke-quarter-turn-actuator_fig1_322504810> FIG. 1.
(Continued)

*Primary Examiner* — Shawki S Ismail
*Assistant Examiner* — Lisa N Homza
(74) *Attorney, Agent, or Firm* — Harter Secrest & Emery LLP; Timothy W. Menasco, Esq.

(57) ABSTRACT

Embodiments of the present disclosure include a method and apparatus. An exemplary apparatus includes a solenoid assembly that includes a ferromagnetic core tube having a first channel and a second channel disposed on the radial exterior surface of the ferromagnetic core tube. The first channel and the second channel circumscribe the ferromagnetic core tube along a given portion of the longitudinal axis. The first channel and the second channel are spaced from one another along the longitudinal axis. The first channel has a first magnetic ring radially spaced apart from a first thin
(Continued)

Figure 1:
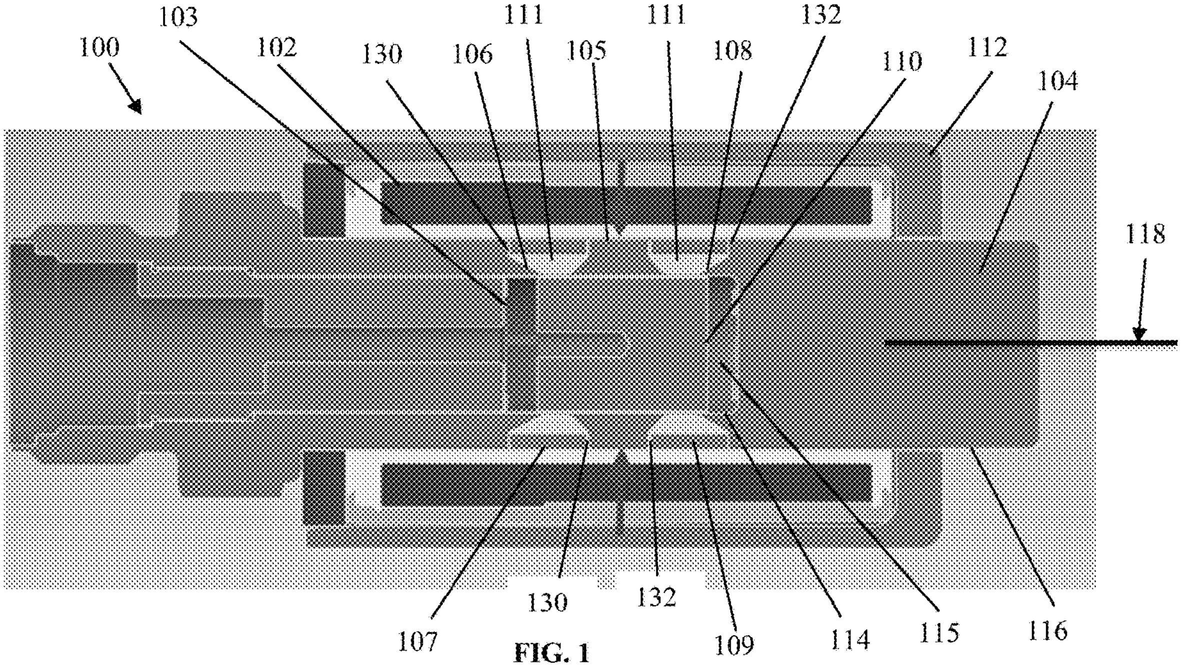

wall. The second channel has a second magnetic ring radially spaced part from a second thin wall. The solenoid assembly also includes a coil located radially outward of the ferromagnetic core tube.

19 Claims, 8 Drawing Sheets

(58) Field of Classification Search
USPC .......................................................... 335/279
See application file for complete search history.

(56) References Cited

U.S. PATENT DOCUMENTS

| | | | | |
|---|---|---|---|---|
| 4,004,343 | A | 1/1977 | Marsden | |
| 4,604,600 | A * | 8/1986 | Clark | H01F 7/13 335/279 |
| 4,808,955 | A * | 2/1989 | Godkin | H01F 7/066 310/13 |
| 5,149,996 | A | 9/1992 | Preston et al. | |
| 5,257,014 | A * | 10/1993 | Zimmermann | G01B 7/02 137/554 |
| 5,325,888 | A | 7/1994 | Stary | |
| 6,313,726 | B1 | 11/2001 | Golovatai-Schmidt | |
| 6,460,557 | B1 * | 10/2002 | Levitan | F15B 13/0402 251/129.1 |
| 6,540,204 | B1 * | 4/2003 | Carter | F02M 21/0254 251/30.01 |
| 7,025,325 | B2 | 4/2006 | Kwon | |
| 7,213,613 | B2 | 5/2007 | Spakowski et al. | |
| 7,264,017 | B2 | 9/2007 | Denike et al. | |
| 7,541,563 | B1 * | 6/2009 | Pal | F41A 19/60 89/1.51 |
| 7,597,123 | B2 | 10/2009 | Wang | |
| 8,087,316 | B2 | 1/2012 | Holtgraver | |
| 8,191,860 | B2 | 6/2012 | Eschborn et al. | |
| 10,316,982 | B2 * | 6/2019 | Deland | H01F 7/1607 |
| 10,533,583 | B2 | 1/2020 | Holtgraver et al. | |
| 11,168,795 | B1 | 11/2021 | Heffernan | |
| 11,664,144 | B2 | 5/2023 | Tyler | |
| 2001/0022474 | A1 * | 9/2001 | Tachibana | F16K 31/0613 310/15 |
| 2002/0057153 | A1 * | 5/2002 | Matsusaka | H01F 7/1607 335/220 |
| 2002/0060620 | A1 | 5/2002 | Bircann et al. | |
| 2002/0125343 | A1 * | 9/2002 | Yildirim | F02M 51/0664 239/533.2 |
| 2002/0195884 | A1 * | 12/2002 | Ichii | A61C 17/34 310/15 |
| 2005/0006611 | A1 * | 1/2005 | Choi | F16K 31/082 251/65 |
| 2005/0024174 | A1 | 2/2005 | Kolb et al. | |
| 2005/0057101 | A1 | 3/2005 | Nakagawa et al. | |
| 2006/0043326 | A1 | 3/2006 | Linkner, Jr. et al. | |
| 2008/0180200 | A1 * | 7/2008 | Gamble | H01F 7/081 335/234 |
| 2011/0115587 | A1 * | 5/2011 | Ishibashi | H01F 7/081 335/255 |
| 2013/0200285 | A1 | 8/2013 | Gent et al. | |
| 2013/0328649 | A1 | 12/2013 | Robertson | |
| 2014/0145101 | A1 * | 5/2014 | Ishibashi | F02M 21/0239 251/129.15 |
| 2014/0306136 | A1 * | 10/2014 | Schmieder | F02M 61/08 251/129.19 |
| 2014/0346383 | A1 | 11/2014 | Graner et al. | |
| 2015/0097130 | A1 | 4/2015 | Gieras et al. | |
| 2015/0348691 | A1 * | 12/2015 | Peterson | H01F 7/1607 335/282 |
| 2015/0349619 | A1 | 12/2015 | Degner et al. | |
| 2016/0126043 | A1 * | 5/2016 | Hoppe | H01H 49/00 335/203 |
| 2016/0329143 | A1 * | 11/2016 | Irie | F16K 27/048 |
| 2017/0146037 | A1 | 5/2017 | Curtin | |
| 2017/0248111 | A1 * | 8/2017 | Marechal | F16K 31/402 |
| 2018/0180192 | A1 * | 6/2018 | Jamison | F16K 27/029 |
| 2019/0217439 | A1 | 7/2019 | Phelps | |
| 2020/0096130 | A1 * | 3/2020 | Najmolhoda | F16K 31/0675 |
| 2021/0031218 | A1 * | 2/2021 | Yan | B05B 1/3053 |
| 2022/0055513 | A1 * | 2/2022 | Zhang | F16K 11/24 |
| 2022/0336131 | A1 | 10/2022 | Guthrie | |
| 2023/0349483 | A1 * | 11/2023 | Holmes | F16K 31/0655 |
| 2024/0052944 | A1 | 2/2024 | Kubacki et al. | |

FOREIGN PATENT DOCUMENTS

| | | | |
|---|---|---|---|
| CN | 210860008 | U | 6/2020 |
| DE | 2236586 | A1 | 2/1974 |
| DE | 19646446 | A1 | 5/1998 |
| DE | 10 2008 030748 | A1 | 12/2009 |
| DE | 10 2012 214618 | A1 | 2/2014 |
| DE | 10 2012 213052 | A1 | 5/2014 |
| DE | 10 2013 211816 | A1 | 12/2014 |
| DE | 10 2015 224152 | B3 | 3/2017 |
| EP | 0569669 | A1 | 11/1993 |
| EP | 3167214 | A1 | 5/2017 |
| JP | H03(1991)-38805 | A | 2/1991 |
| JP | 06-038485 | A | 2/1994 |
| JP | 07-011397 | A | 1/1995 |
| JP | 2000166209 | A | 6/2000 |
| JP | 2001006925 | A | 1/2001 |
| JP | 2001012636 | A | 1/2001 |
| JP | 2001145321 | A | 5/2001 |
| JP | 2003148647 | A | 5/2003 |
| JP | 2005030586 | A | 2/2005 |
| JP | 2012163208 | A | 8/2012 |
| KR | 10 2010 0034650 | A | 4/2010 |
| WO | 2018167964 | A1 | 9/2018 |
| WO | 2019217439 | A1 | 11/2019 |
| WO | 2021061893 | A1 | 4/2021 |
| WO | 2022071988 | A1 | 4/2022 |

OTHER PUBLICATIONS

Memphis 72 (Sep. 19, 2017) "Rack and Pinion vs Scotch Yoke," YouTube, Retrieved from the internet: <url:https://www.youtube.com/watch?v=FWLeALL8CDY> [00:52].

Realpars (Aug. 5, 2019) "What is a Spool Valve?" YouTube, Retrieved from the Internet: <url: https://www.youtube.com/watch?v=Jfdmrm4A99s> [1:08], [1:16-1:23], [1:34].

Shepherd (Nov. 9, 2016) "Rack & Pinion Valve Actuators," YouTube, Retrieved from the internet: <url: https://www.youtube.com/watch?v=2bwlz6y_KjQ> [00:28].

* cited by examiner

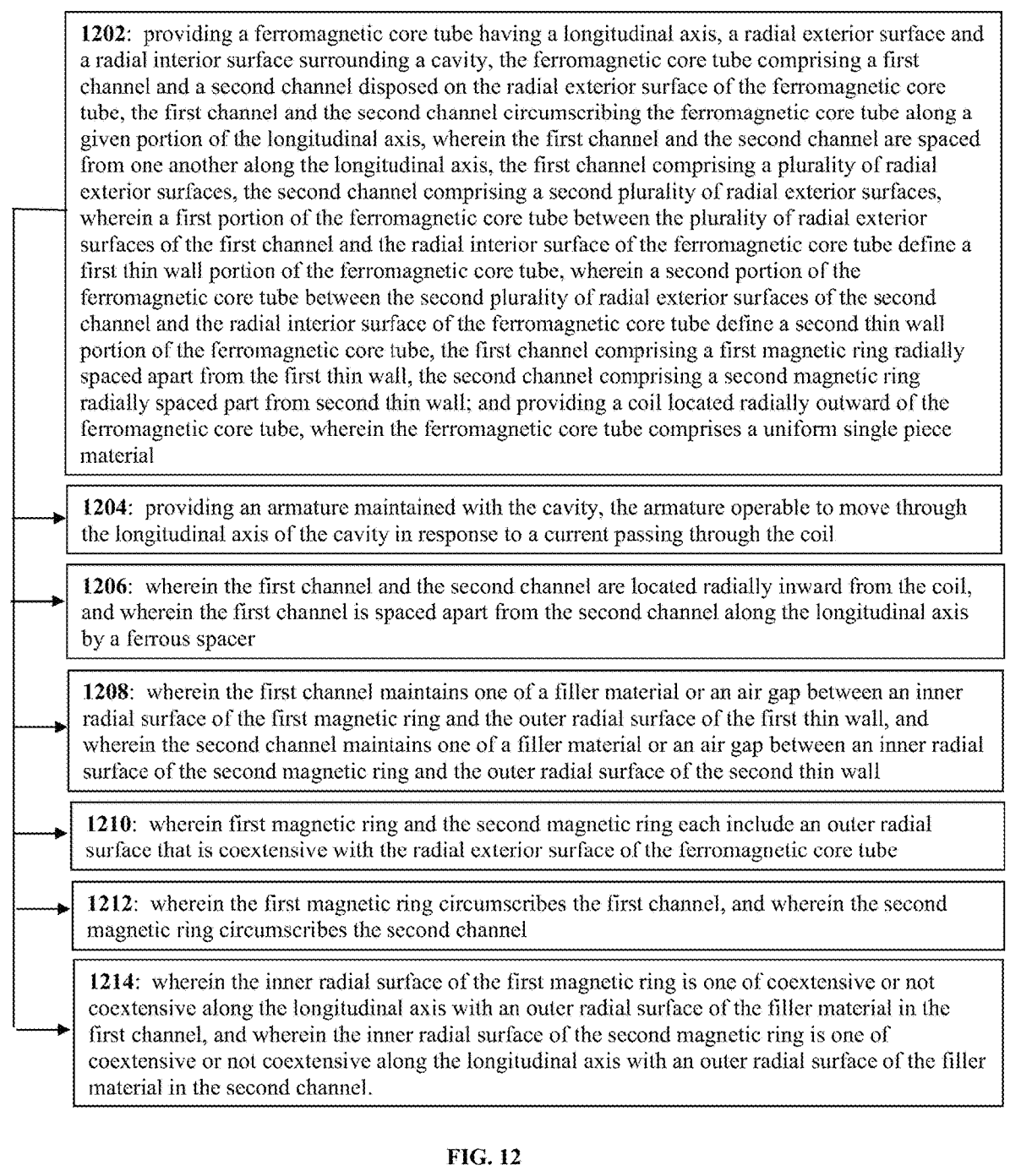

1202: providing a ferromagnetic core tube having a longitudinal axis, a radial exterior surface and a radial interior surface surrounding a cavity, the ferromagnetic core tube comprising a first channel and a second channel disposed on the radial exterior surface of the ferromagnetic core tube, the first channel and the second channel circumscribing the ferromagnetic core tube along a given portion of the longitudinal axis, wherein the first channel and the second channel are spaced from one another along the longitudinal axis, the first channel comprising a plurality of radial exterior surfaces, the second channel comprising a second plurality of radial exterior surfaces, wherein a first portion of the ferromagnetic core tube between the plurality of radial exterior surfaces of the first channel and the radial interior surface of the ferromagnetic core tube define a first thin wall portion of the ferromagnetic core tube, wherein a second portion of the ferromagnetic core tube between the second plurality of radial exterior surfaces of the second channel and the radial interior surface of the ferromagnetic core tube define a second thin wall portion of the ferromagnetic core tube, the first channel comprising a first magnetic ring radially spaced apart from the first thin wall, the second channel comprising a second magnetic ring radially spaced part from second thin wall; and providing a coil located radially outward of the ferromagnetic core tube, wherein the ferromagnetic core tube comprises a uniform single piece material

1204: providing an armature maintained with the cavity, the armature operable to move through the longitudinal axis of the cavity in response to a current passing through the coil

1206: wherein the first channel and the second channel are located radially inward from the coil, and wherein the first channel is spaced apart from the second channel along the longitudinal axis by a ferrous spacer

1208: wherein the first channel maintains one of a filler material or an air gap between an inner radial surface of the first magnetic ring and the outer radial surface of the first thin wall, and wherein the second channel maintains one of a filler material or an air gap between an inner radial surface of the second magnetic ring and the outer radial surface of the second thin wall

1210: wherein first magnetic ring and the second magnetic ring each include an outer radial surface that is coextensive with the radial exterior surface of the ferromagnetic core tube

1212: wherein the first magnetic ring circumscribes the first channel, and wherein the second magnetic ring circumscribes the second channel

1214: wherein the inner radial surface of the first magnetic ring is one of coextensive or not coextensive along the longitudinal axis with an outer radial surface of the filler material in the first channel, and wherein the inner radial surface of the second magnetic ring is one of coextensive or not coextensive along the longitudinal axis with an outer radial surface of the filler material in the second channel.

FIG. 12

METHOD AND APPARATUS HAVING A SINGLE COIL WITH EMBEDDED MAGNETS

BACKGROUND OF THE INVENTION

Field of the Invention

The present disclosure relates to a solenoid assembly. The present invention relates more particularly to an improved solenoid assembly having embedded magnets.

Description of Related Art

A solenoid is a type of electromagnet that can include a coil that operable to form magnetic fields. In operation, solenoids typically allow a current to pass through their coil thereby creating a magnetic field within the immediate vicinity of the coil. Solenoids can be used in valves that are integrated devices having an electromechanical solenoid operable to actuate a valve.

BRIEF SUMMARY OF THE INVENTION

In view of the foregoing, it is an object of the present disclosure to provide a method and apparatus.

A first exemplary embodiment of the present disclosure provides a solenoid assembly. The solenoid assembly having a ferromagnetic core tube having a longitudinal axis, a radial exterior surface and a radial interior surface surrounding a cavity, the ferromagnetic core tube comprising a first channel and a second channel disposed on the radial exterior surface of the ferromagnetic core tube, the first channel and the second channel circumscribing the ferromagnetic core tube along a given portion of the longitudinal axis, wherein the first channel and the second channel are spaced from one another along the longitudinal axis, the first channel comprising a plurality of radial exterior surfaces, the second channel comprising a second plurality of radial exterior surfaces, wherein a first portion of the ferromagnetic core tube between the plurality of radial exterior surfaces of the first channel and the radial interior surface of the ferromagnetic core tube define a first thin wall portion of the ferromagnetic core tube, wherein a second portion of the ferromagnetic core tube between the second plurality of radial exterior surfaces of the second channel and the radial interior surface of the ferromagnetic core tube define a second thin wall portion of the ferromagnetic core tube, the first channel comprising a first magnetic ring radially spaced apart from the first thin wall, the second channel comprising a second magnetic ring radially spaced part from second thin wall. The solenoid assembly further includes a coil located radially outward of the ferromagnetic core tube, wherein the ferromagnetic core tube comprises a uniform single piece material.

A second exemplary embodiment of the present disclosure provides a solenoid assembly having a ferromagnetic core tube having a longitudinal axis, a radial exterior surface and a radial interior surface surrounding a cavity, the ferromagnetic core tube comprising a first channel and a second channel disposed on the radial exterior surface of the ferromagnetic core tube, the first channel and the second channel circumscribing the ferromagnetic core tube along a given portion of the longitudinal axis, wherein the first channel and the second channel are spaced from one another along the longitudinal axis, the first channel comprising a plurality of radial exterior surfaces, the second channel comprising a second plurality of radial exterior surfaces, wherein a first portion of the ferromagnetic core tube between the plurality of radial exterior surfaces of the first channel and the radial interior surface of the ferromagnetic core tube define a first thin wall portion of the ferromagnetic core tube, wherein a second portion of the ferromagnetic core tube between the second plurality of radial exterior surfaces of the second channel and the radial interior surface of the ferromagnetic core tube define a second thin wall portion of the ferromagnetic core tube, the first channel comprising a first magnetic ring radially spaced apart from the first thin wall, the second channel comprising a second magnetic ring radially spaced part from second thin wall. The solenoid assembly further includes an armature maintained with the cavity, the armature operable to move through the longitudinal axis of the cavity in response to a current passing through the coil. The solenoid assembly still further includes a coil located radially outward of the ferromagnetic core tube, wherein the ferromagnetic core tube comprises a uniform single piece material, wherein the first channel maintains a filler material between an inner radial surface of the first magnetic ring and the outer radial surface of the first thin wall, and wherein the second channel maintains a filler material between an inner radial surface of the second magnetic ring and the outer radial surface of the second thin wall.

A third exemplary embodiment of the present disclosure provides a method. The method includes providing a ferromagnetic core tube having a longitudinal axis, a radial exterior surface and a radial interior surface surrounding a cavity, the ferromagnetic core tube comprising a first channel and a second channel disposed on the radial exterior surface of the ferromagnetic core tube, the first channel and the second channel circumscribing the ferromagnetic core tube along a given portion of the longitudinal axis, wherein the first channel and the second channel are spaced from one another along the longitudinal axis, the first channel comprising a plurality of radial exterior surfaces, the second channel comprising a second plurality of radial exterior surfaces, wherein a first portion of the ferromagnetic core tube between the plurality of radial exterior surfaces of the first channel and the radial interior surface of the ferromagnetic core tube define a first thin wall portion of the ferromagnetic core tube, wherein a second portion of the ferromagnetic core tube between the second plurality of radial exterior surfaces of the second channel and the radial interior surface of the ferromagnetic core tube define a second thin wall portion of the ferromagnetic core tube, the first channel comprising a first magnetic ring radially spaced apart from the first thin wall, the second channel comprising a second magnetic ring radially spaced part from second thin wall. The method further includes providing a coil located radially outward of the ferromagnetic core tube, wherein the ferromagnetic core tube comprises a uniform single piece material.

The following will describe embodiments of the present disclosure, but it should be appreciated that the present disclosure is not limited to the described embodiments and various modifications of the disclosure are possible without departing from the basic principles. The scope of the present disclosure is therefore to be determined solely by the appended claims.

BRIEF DESCRIPTION OF THE SEVERAL VIEWS OF THE DRAWING(S)

FIG. 1 presents a cross-sectional view of an exemplary device suitable for use in practicing exemplary embodiments of this disclosure.

Figure 2:
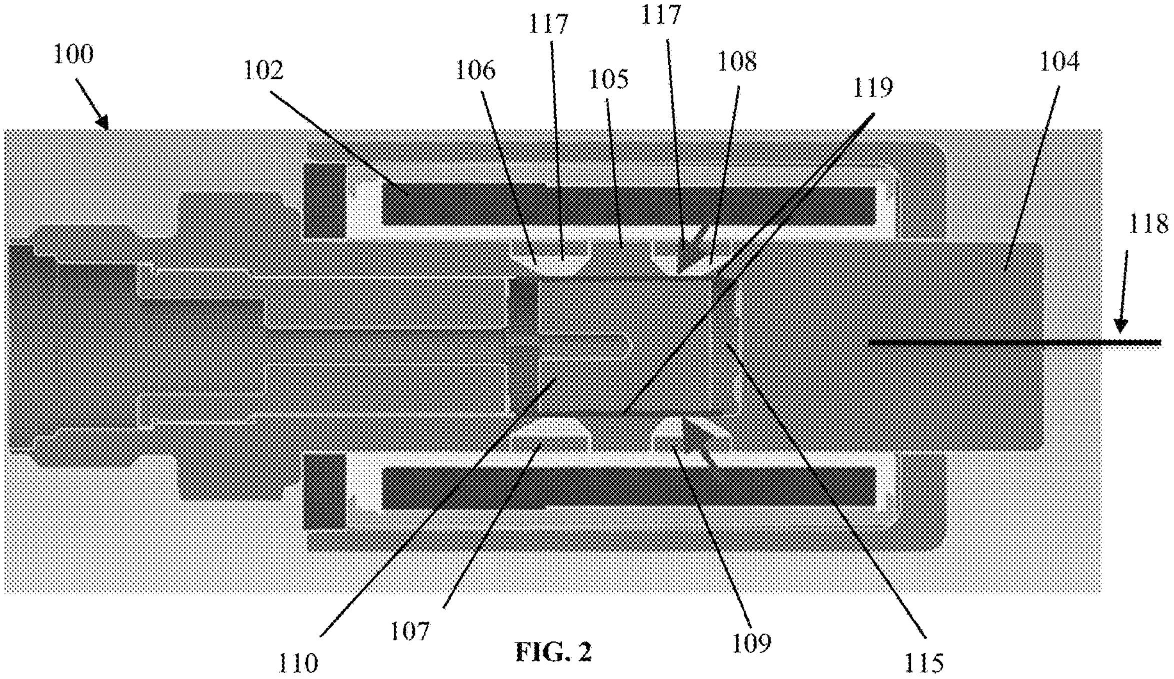

FIG. 2 presents a cross-sectional view of another exemplary device suitable for use in practicing exemplary embodiments of this disclosure.

Figure 3:
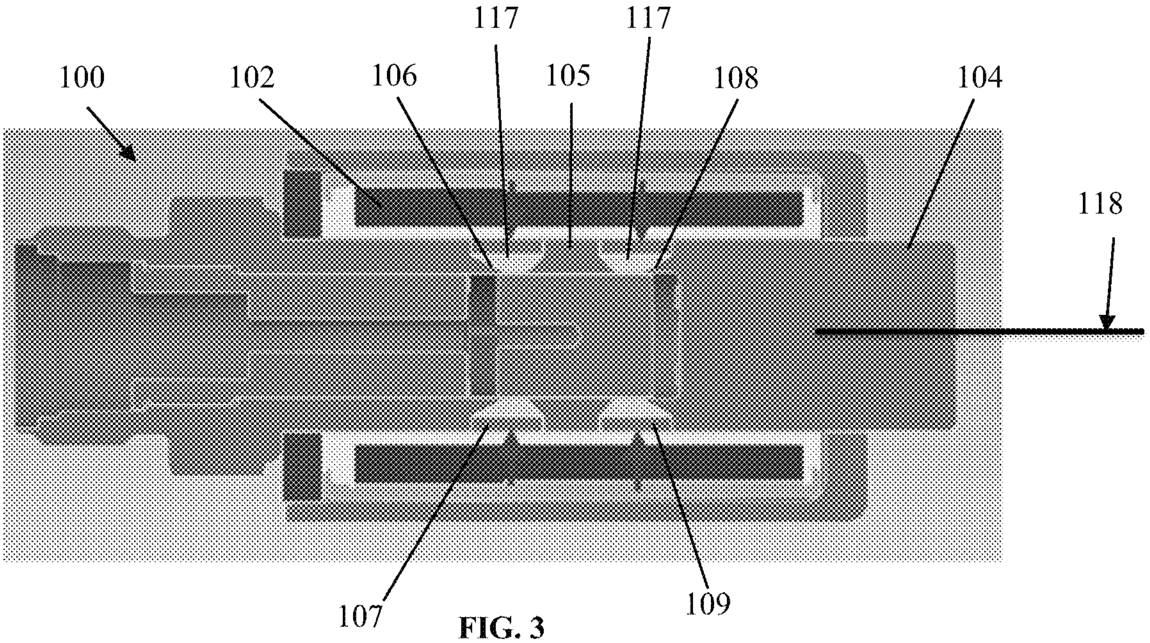

FIG. 3 presents yet another cross-sectional view of an exemplary device suitable for use in practicing exemplary embodiments of this disclosure.

Figure 4:
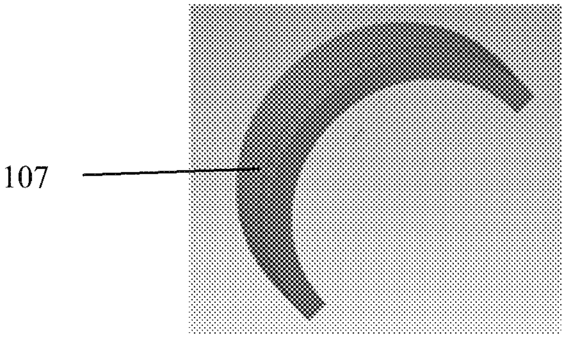

FIG. 4 presents a perspective view of a portion of an exemplary magnetic ring suitable for use in practicing exemplary embodiments of this disclosure.

Figure 5:
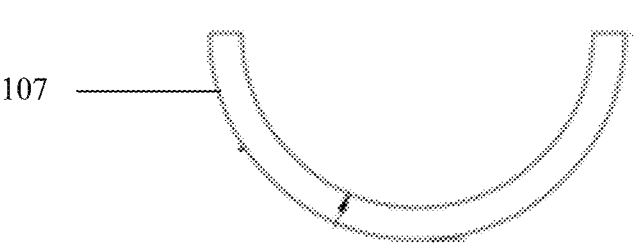

FIG. 5 presents a cross-sectional view of a portion of an exemplary magnetic ring suitable for use in practicing exemplary embodiments of this disclosure.

Figure 6:
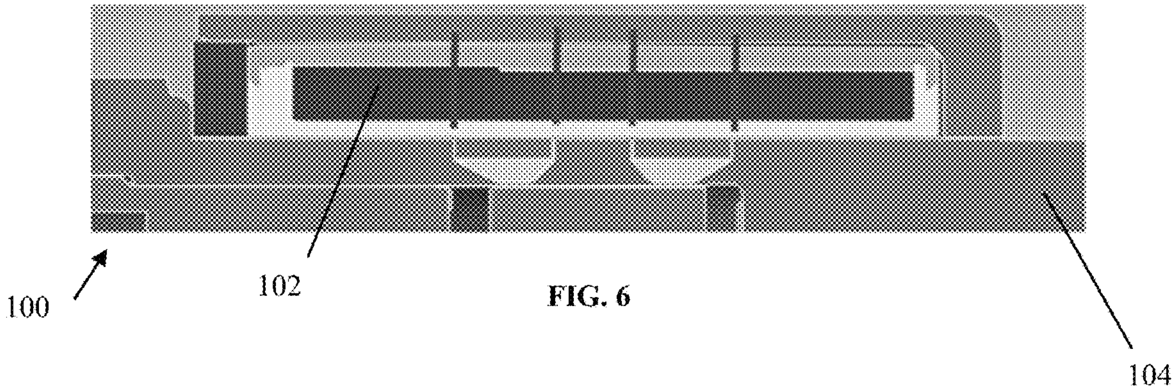

FIG. 6 presents a close-up cross-sectional view of a portion of an exemplary device suitable for use in practicing exemplary embodiments of this disclosure.

Figure 7:
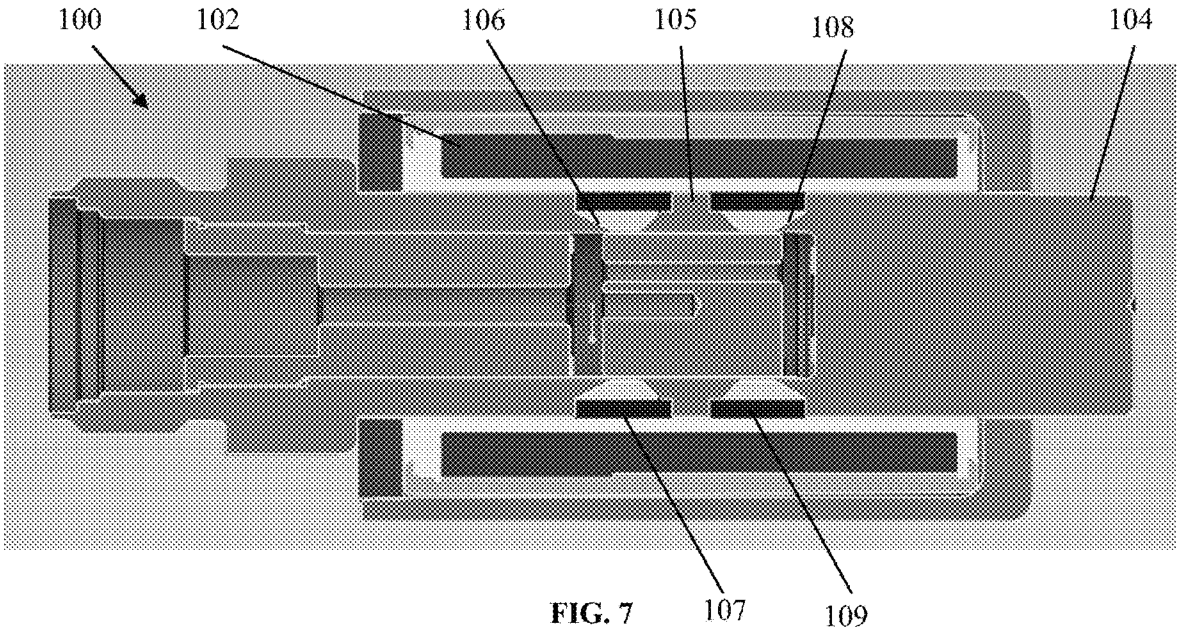

FIG. 7 presents a cross-sectional view of yet another embodiment of a device suitable for use in practicing exemplary embodiments of this disclosure.

Figure 8:
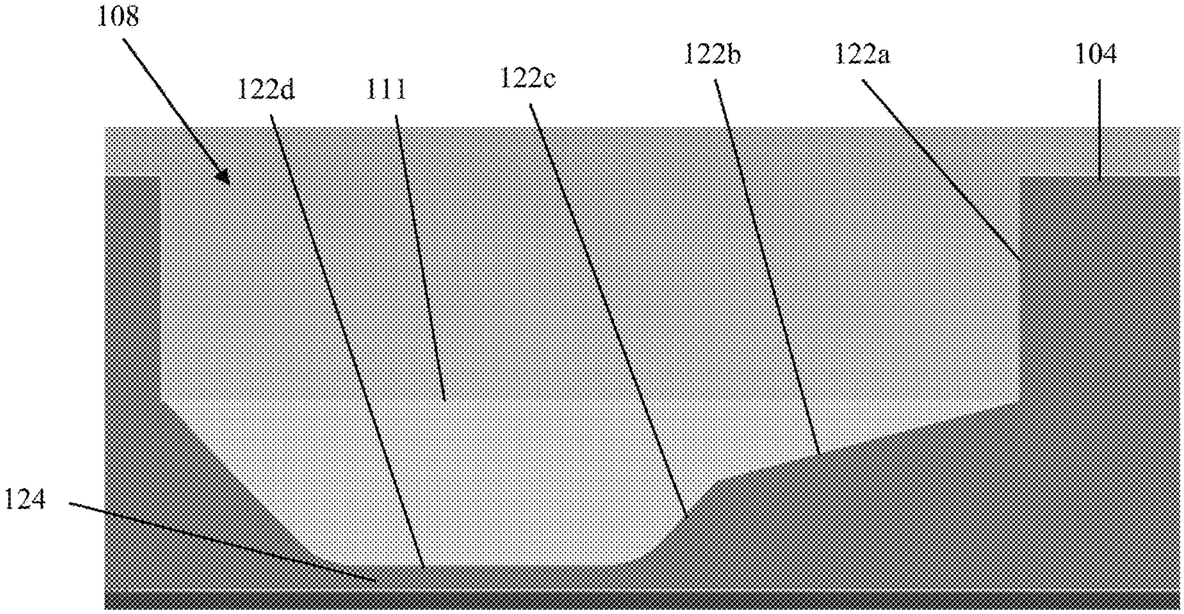

FIG. 8 presents a close-up cross-sectional view of an exemplary channel on a device suitable for use in practicing exemplary embodiments of this disclosure.

Figure 9:
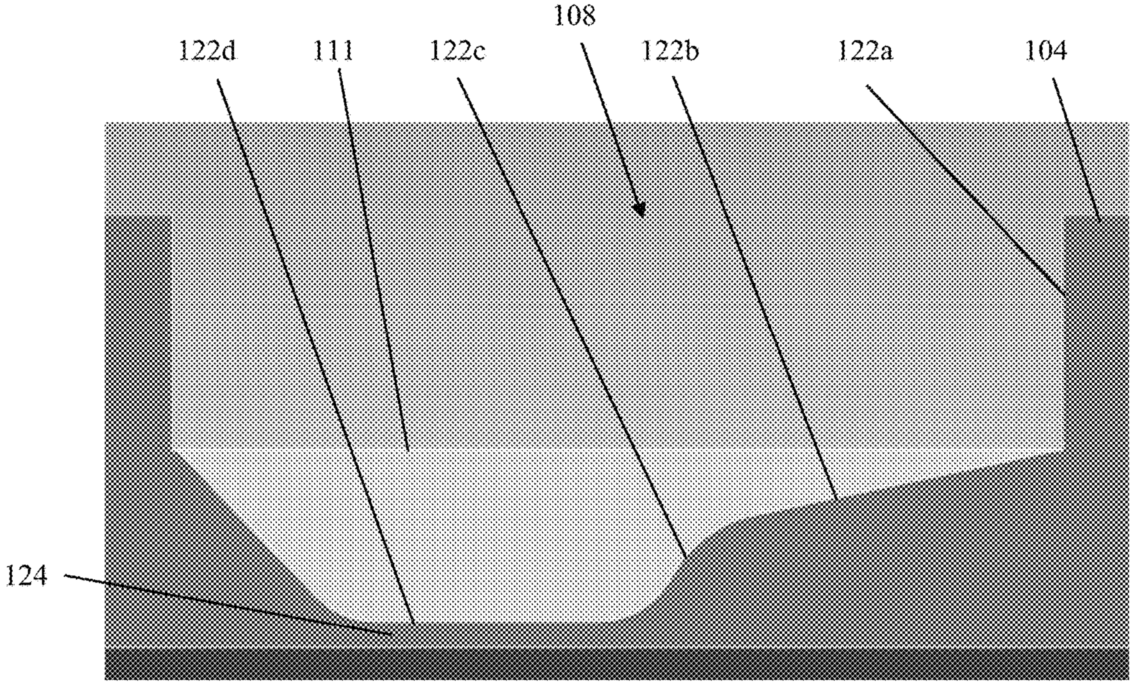

FIG. 9 presents a close-up cross-sectional view of another exemplary channel on a device suitable for use in practicing exemplary embodiments of this disclosure.

Figure 10:
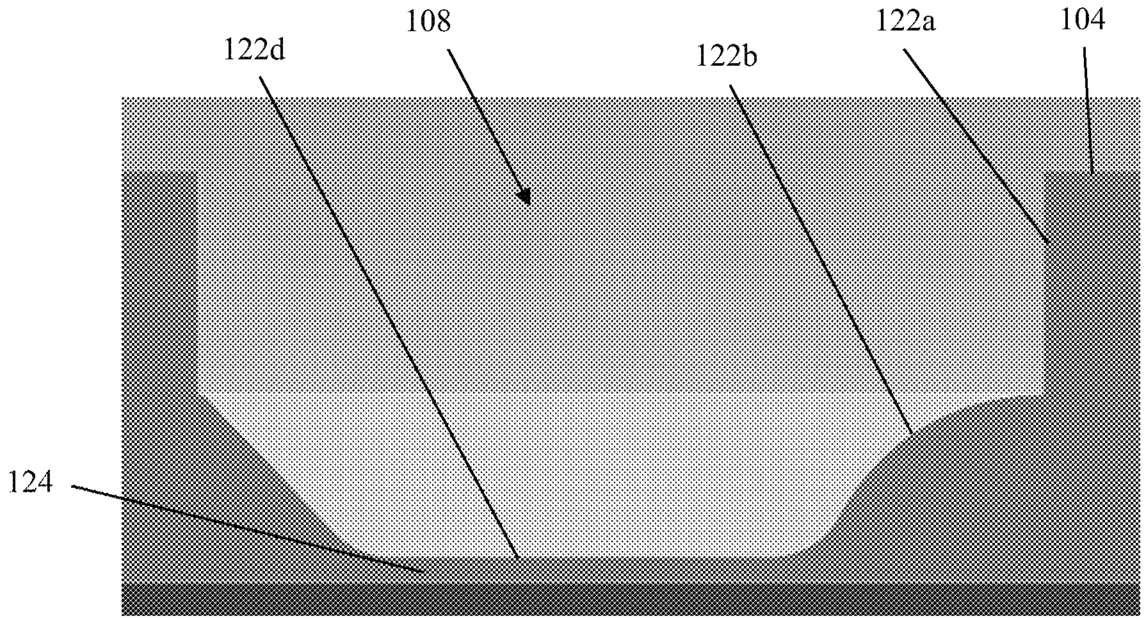

FIG. 10 presents a close-up cross-sectional view of yet another exemplary channel on a device suitable for use in practicing exemplary embodiments of this disclosure.

Figure 11:
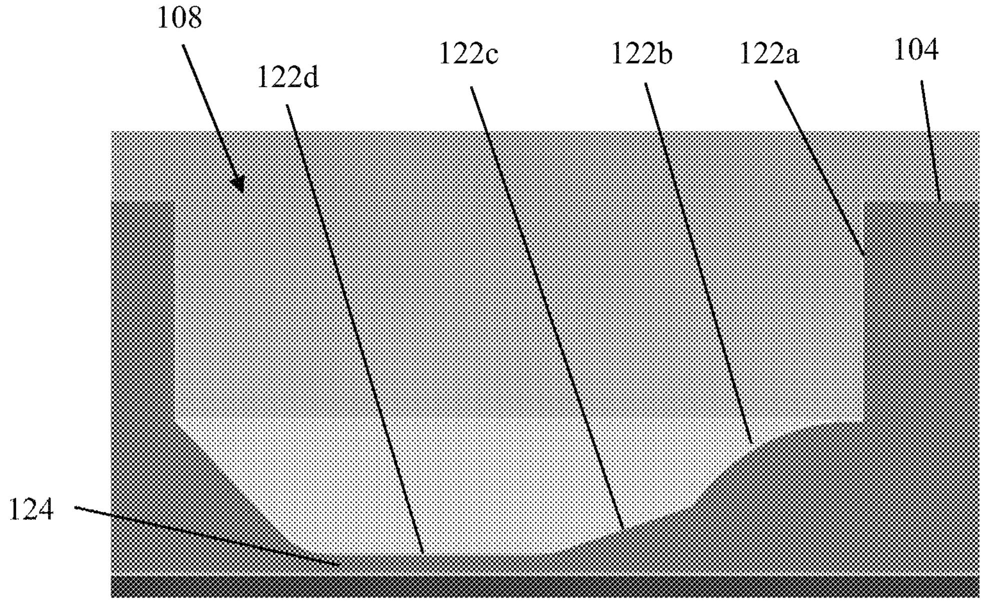

FIG. 11 presents a close-up cross-sectional view of another alternative exemplary channel on a device suitable for use in practicing exemplary embodiments of this disclosure.

FIG. 12 presents a logic flow diagram in accordance with an exemplary method or process suitable for practicing exemplary embodiments of this disclosure.

Figure 13:
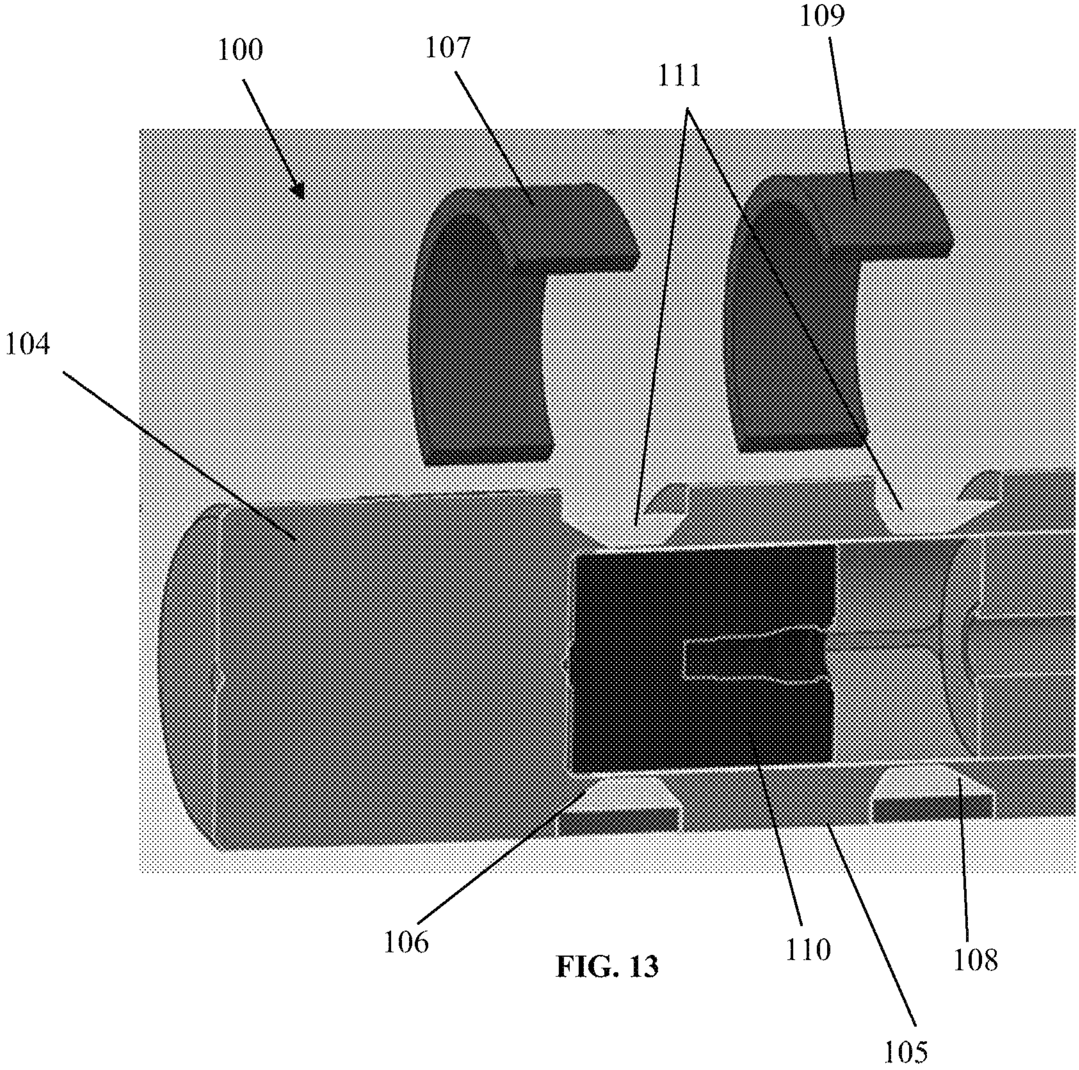

FIG. 13 presents a cross-sectional view of an exemplary device with spaced apart magnets suitable for practicing exemplary embodiments of this disclosure.

Figure 14:
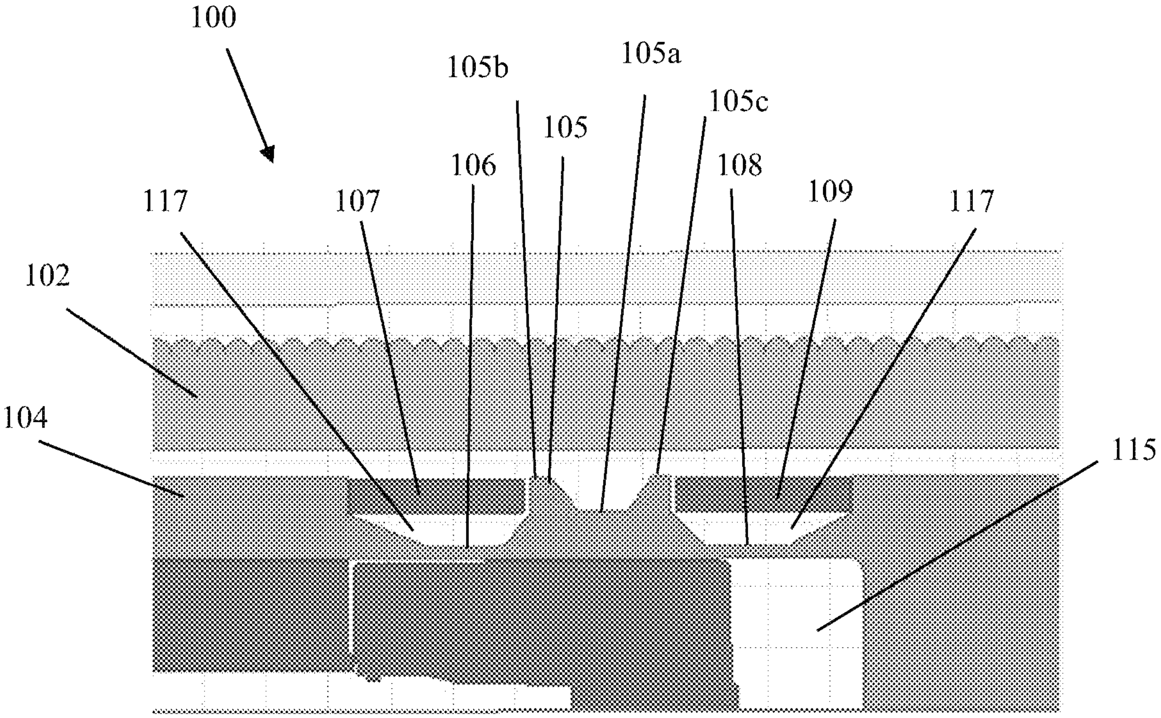

FIG. 14 presents a cross-sectional view of an exemplary device having a channel spacer suitable for practicing exemplary embodiments of this disclosure.

DETAILED DESCRIPTION OF THE INVENTION

Embodiments of the present disclosure provide a solenoid assembly having a core tube that is circumscribed by a single coil, excitation coil, wound coil, or coil. Embodiments of the core tube include a ferromagnetic tube having a uniform tube thickness along its longitudinal axis except for a pair of channels that circumscribe the radial exterior surface of the core tube. Embodiments of the core tube include having a pair of channels that have a thinner cross section of the core tube. Within the core tube is a cavity that maintains a moveable armature operable to move through the longitudinal axis of the cavity in response to magnetic flux created by current passing through the coil. Embodiments include the core tube being a ferromagnetic tube having a uniform diameter across its longitudinal axis except for a pair of spaced apart channels circumscribing the radial exterior surface of the core tube. Each of the channels are located radially inward from the coil. The two channels are separated from one another along the longitudinal axis by a ferrous spacer. Within each of the channels along the inner radial portion of the channels are a non-magnetic filler material welded to the outer radial surface of the channels. Embodiments include the filler material being replaced by an air gap such that there is an air gap between the radial inner surface of the magnets and the outer radial surface of the core tube. Radially outwardly adjacent the filler material is a magnet or magnets that circumscribe the filler material. Each of the magnets are embedded within the core tube such that the radial exterior surface of the core tube and the radial exterior surface of the magnets are coextensive. A thin wall of the core tube separates the filler material from the inside cavity of the core tube. Embodiments of the magnets are removable from the channels and the core tube such that they can be replaced with new magnets in the instance that the magnets degrade or lose their magnetic force. Embodiments provide that a small gap may exist between the side edges of the magnets and the adjacent core tube surface.

Embodiments of the present disclosure include a solenoid assembly having a core tube that has a Teflon coated sleeve located or disposed along the inner radial surface of the cavity of the core tube. Embodiments provide that the Teflon coated sleeve is operable to reduce friction between the armature and the tube.

It should be appreciated that each magnet that circumscribes the core tube may include multiple curved magnets that are in contact with or close proximity to one another such that in combination they collectively circumscribe the core tube. One embodiment includes that the magnets be C-shaped such that two or more C-shaped magnets are operable to collectively circumscribe the core tube.

In one embodiment, the location of the magnets and the length of the magnets along the longitudinal axis are equal in length to the radially outer most surface of the filler material such that the magnets and the filler material are coextensive in the longitudinal direction. In another embodiment, the magnets are coextensive in the longitudinal direction with the filler material along the edge adjacent the spacer, but are not coextensive on the edge opposite from the spacer such that the magnets extend beyond the filler material. In yet another embodiment, the magnets are coextensive in the longitudinal direction with the filler material along the edge opposite from the spacer, but are not coextensive on the edge adjacent the spacer such that the magnets extend over the spacer. In yet a further embodiment, the magnets are located such that they are radially outward from the filler material. In this embodiment, the magnets are not coextensive with the filler material on either the edge adjacent the spacer or the edge opposite from the spacer. In other words, in this embodiment, the magnets are longer than the filler material in the longitudinal direction and extend past the edge of the filler material that is adjacent the spacer and opposite from the spacer.

Referring to FIG. 1, shown is a cross-sectional view of an exemplary device suitable for use in practicing exemplary embodiments of this disclosure. Shown in FIG. 1 is a solenoid assembly 100 having a coil 102 (also referred to as an excitation coil or wound coil), a core tube 104, a first channel 106, a second channel 108, and an armature 110. Core tube 104 includes a longitudinal axis 118. The coil 102 is enclosed in a housing 112 and located such that the coil 102 is radially outward from the core tube 104. Coil 102 circumscribes core tube 104. Coil 102 is operable to have a current pass through it in order to create a magnetic flux that passes through core tube 104 and armature 110 causing armature 110 to move through cavity 115 along the longitudinal axis 118. Embodiments of coil 102 include it being made of enamel magnet wire made of copper or aluminum, nickel plated magnet wire, ceramic coated magnet wire, extruded jacketed magnet wire such as, but not limited to, extruded materials of TFE, polyether ether ketone (PEEK), polyimide, or any other thin film polyamide-imide, polyester-imide/polyamide-imide coated magnet wire or any combination of materials thereof. Embodiments include coil 102 circumscribing the portion of core tube 104 that includes the first channel 106, the second channel 108, and the ferrous spacer 105. Embodiments of core tube 104 include a cylindrically shaped hollow tube having a radial interior surface 114 and a radial exterior surface 116. Embodiments of core tube 104 include it being made of a single uniform ferromagnetic material. It should be appreciated that embodiments of core tube 104 include it being made of multiple materials that are welded together. The term ferromagnetic includes ferrous materials and those materials that have a high susceptibility to magnetization. Other than the first channel 106 and the second channel 108, core tube 104 has a uniform thickness between its radial interior surface 114 and its radial exterior surface 116 throughout its longitudinal axis 118.

The first channel 106 and the second channel 108 each define a groove disposed on the radial exterior surface 116 of core tube 104. The first channel 106, spacer 105 and the second channel 108 are located radially inward from coil 102. The first channel 106 is spaced apart from the second channel 108 such that they each circumscribe the radial exterior surface 116 of core tube 104 along a set range along the longitudinal axis 118 of core tube 104. The first channel 106 is spaced apart and separated from the second channel 108 in the longitudinal direction by a ferrous spacer 105. Ferrous spacer 105 is integral with the core tube 104 and extends radially outward from the radial interior surface 114 of the cavity 115 to the radial exterior surface 114. Embodiments of ferrous spacer 105 include ferrous spacer 105 having the same uniform thickness as the radial interior surface 114 and radial exterior surface 116 of the remainder of core tube 104 (shown in FIG. 1). Embodiments of ferrous spacer 105 include is having a channel 105*a* (shown in FIG. 14) that circumscribes the radial exterior surface of ferrous spacer 105. Channel 105*a* defines a groove disposed on the radial exterior surface of ferrous spacer 105 of core tube 104. As shown in FIG. 14, channel 105*a* is spaced from the first and second channels 106, 108 such that a portion (105*b*, 105*c*) of ferrous spacer 105 has the same uniform thickness as the radial interior surface 114 and radial exterior surface 116 of the remainder of core tube 104. As illustrated in FIG. 14, channel 105*a* does not extend as far radially inward as first and second channels 106, 108 such that the thickness of core tube 104 radially inward from channel 105 is greater than the thickness of core tube 104 radially inward from the first and second channels 106, 108. The first channel 106, the ferrous spacer 105 and the second channel 108 are located on the core tube 104 such that they are radially outward from the cavity 115. Embodiments include the radial interior surface 114 having a Teflon coating 119 or a separate tetrafluoroethylene (TFE) sleeve (shown in FIG. 2) that is in contact with the armature 110 outside diameter and the fluid maintained within the cavity 115 is contained within the radial interior surface 114, and is in contact with the Teflon coating or the TFE inserted sleeve. Embodiments of the TFE sleeve are removably from the cavity 115 of core tube 104 and loose within the cavity 115 of core tube 104 such that it is held or maintained in place within the cavity 115 of core tube 104 be the stopper end 103 of core tube 104.

The first channel 106 is located such that along its cross-section along the longitudinal axis 118 of core tube 104, it has a uniform thickness in the radial direction. Similarly, the second channel 108 is located such that along its cross-section along the longitudinal axis 118 of core tube 104, it has a uniform thickness in the radial direction. Embodiments of the first channel 106 and the second channel 108 include them maintaining either (i) a filler material 111, or (ii) an air gap 117 (shown in FIGS. 2 & 14) along a radially inward portion of each channel. Embodiments of the first channel 106 and the second channel 108 also include them maintaining a first magnetic ring 107 and a second magnetic ring 109, respectively.

The first magnetic ring 107 is located radially outward from and in contact with either the filler material 111 or the air gap 117 within the first channel 106. The second magnetic ring 109 is located radially outward from either the filler material 111 or the air gap 117 within the second channel 106. Embodiments of the first magnetic ring 107 and the second magnetic ring 109 include two or a plurality of curved or C-shaped magnets (shown in FIGS. 4, 5 and 13) that circumscribe the core tube 104 within the first and the second channels 106, 108, respectively. In the embodiments shown in FIGS. 4, 5 and 13, curved or C-shaped magnets are sized such that two or more C-shaped magnets would circumscribe a single core tube 104. However, it should be appreciated that embodiments of C-shaped magnets include more than two magnets or a plurality of magnets that circumscribe a given core tube 104. It should be appreciated that embodiments of the first magnetic ring 107 and the second magnetic ring 109 are removably located within the first and second channel 106, 108, respectively (shown in FIG. 13). Embodiments provide that only the magnetic forces from the first magnetic ring 107 and the second magnetic ring 109 maintain the location of the each of the rings within the first and second channels 106, 108, respectively. Embodiments provide that first magnetic ring 107 and the second magnetic ring 109 are not held in place within the first and second channels 106, 108 by welding or an adhesive between the first and second magnetic rings 107, 109 and the first and second channels 106, 108. In another embodiment, the first and second magnetic ring 107, 108 are maintained in place within first and second channels 106, 108 by welding or an adhesive. The first magnetic ring 107 and the second magnetic ring 109 in some embodiments are coextensive with the adjacent filler material or air gap in the longitudinal axis 118 direction (shown in FIGS. 1-3). As shown in FIGS. 1-3, the terminal edges 130 of the first magnetic ring 107 and the terminal edges 132 of the second magnetic ring 109 in the longitudinal direction are at the same position along the longitudinal axis 118 as the adjacent filler mater 111 or air gap 117.

In other embodiments, the first magnetic ring 107 and the second magnetic ring 109 are not coextensive with the adjacent filler material 111 or air gap in the longitudinal axis 118 direction (shown in FIGS. 6-7). In the embodiments depicted in FIG. 7, the first magnetic ring 107 is coextensive with the filler material along the edge opposite the second magnetic ring 109, but extends further in the longitudinal axis 118 direction toward the second magnetic ring 109. Similarly, in the embodiment depicted in FIG. 7, the second magnetic ring 109 is coextensive with the filler material along the edge opposite the first magnetic ring 107, but extends further in the longitudinal axis 118 direction toward the first magnetic ring 107.

It should be appreciated that both the first channel 106 and the second channel 108 can include two, three or more surfaces on their radial exterior surface. Referring to FIGS. 8-11, shown are close-up cross-sectional views of embodiments of the first channel 106 and the second channel 108. Shown in FIGS. 8-11 are core tube 104 and a portion of the second channel 108. It should be appreciated that for purposes of this disclosure in FIGS. 8-11, the cross-section of the first channel 106 is the mirror image of the second channel 108. Within the second channel 108 is a filler material 111. However, it should be appreciated that embodiments include second channel 108 having an air gap 117 in place of the filler material 111. Embodiments of the filler material 111 include non-magnetic material such as, but not limited to, stainless steel, silicon, copper, bronze, aluminum, tin, nickel, epoxy and any combination of the foregoing. Second channel 108 includes a plurality of outer radial surfaces 122. Embodiments of the plurality of outer radial surfaces 122 can include surfaces that have a straight or flat cross section and surfaces that have a curved cross section.

Shown in FIG. 8, is second channel 108 with outer radial surfaces 122*a*, 122*b*, 122*c*, and 122*d*. As depicted, the cross section of outer radial surface 122*a* is flat and extends substantially perpendicular to the longitudinal axis 118 of the core tube 104. Although not depicted in FIG. 8 (see FIGS. 1-7), outer radial surface 122*a* is located adjacent and in contact with the second magnetic ring 109. The second channel 108 also includes an outer radial surface 122*b*, which is adjacent to outer radial surface 122*a*. Outer radial surface 122*b* has a flat cross section surface and is angled toward outer radial surface 122*d*. Outer radial surface 122*c* is adjacent to outer radial surface 122*b* and is angled such that it is closer to being more perpendicular to the longitudinal axis 118 than outer radial surface 122*b*. Outer radial surface 122*d* is substantially parallel to the longitudinal axis 118. It should be appreciated that embodiments of outer radial surface 122*d* include it being a shallow tapered surface relative to the longitudinal axis 118. Outer radial surface 122*d* and the interior surface radial surface 114 of core tube 104 define the thin wall 124 of the second channel 108 of core tube 104.

Reference is now made to the embodiment of second channel 108 illustrated in FIG. 9. Shown in FIG. 9 is second channel 108 having outer radial surfaces 122*a*, 122*b*, 122*c*, and 122*d*. Outer radial surface 122*a* and 122*b* are similar to that shown in FIG. 8. Outer radial surface 122*c* in FIG. 9, however, has a convex shaped cross section that is curved outward toward the filler material 120. Outer radial surface 122*c* is adjacent to and between outer radial surfaces 122*b* and 122*d*. Similar to the embodiment shown in FIG. 8, outer radial surface 122*d* is substantially parallel to the longitudinal axis 118. It should be appreciated that embodiments of outer radial surface 122*d* include it being a shallow tapered surface relative to the longitudinal axis 118. In FIG. 11, outer radial surface 122*b* rather than outer radial surface 122*c* has a convex shaped cross section that is curved outward toward the filler material 120. In the embodiment depicted in FIG. 11, outer radial surface 122*c* has a flat cross section that is angled relative to the longitudinal axis 118.

Referring to FIG. 10, shown is a close-up cross-sectional view of another embodiment of second channel 108. In the embodiment shown in FIG. 10, second channel includes outer radial surfaces 122*a*, 122*b* and 122*d*. Similar to FIGS. 8-9, outer radial surface 122*a* is perpendicular to the longitudinal axis 118 and extends between the radial exterior surface 116 and outer radial surface 122*b*. In this embodiment, outer radial surface 122*d* is substantially parallel to the longitudinal axis 118. It should be appreciated that embodiments of outer radial surface 122*d* include it being a shallow tapered surface relative to the longitudinal axis 118. Outer radial surface 122*b* has a convex shaped cross section that is curved outward toward the filler material 120. In this embodiment, second channel 108 does not include an outer radial surface 122*c*. Outer radial surface 122*b* is adjacent to and connects outer radial surface 122*a* and 122*d*.

Referring to FIG. 12, shown is an exemplary logic flow diagram in accordance with an exemplary method or process of the present disclosure. The exemplary method begins at block 1202, which states providing a ferromagnetic core tube having a longitudinal axis, a radial exterior surface and a radial interior surface surrounding a cavity, the ferromagnetic core tube comprising a first channel and a second channel disposed on the radial exterior surface of the ferromagnetic core tube, the first channel and the second channel circumscribing the ferromagnetic core tube along a given portion of the longitudinal axis, wherein the first channel and the second channel are spaced from one another along the longitudinal axis, the first channel comprising a plurality of radial exterior surfaces, the second channel comprising a second plurality of radial exterior surfaces, wherein a first portion of the ferromagnetic core tube between the plurality of radial exterior surfaces of the first channel and the radial interior surface of the ferromagnetic core tube define a first thin wall portion of the ferromagnetic core tube, wherein a second portion of the ferromagnetic core tube between the second plurality of radial exterior surfaces of the second channel and the radial interior surface of the ferromagnetic core tube define a second thin wall portion of the ferromagnetic core tube, the first channel comprising a first magnetic ring radially spaced apart from the first thin wall, the second channel comprising a second magnetic ring radially spaced part from second thin wall; and providing a coil located radially outward of the ferromagnetic core tube, wherein the ferromagnetic core tube comprises a uniform single piece material. Next at block 1204, it states providing an armature maintained with the cavity, the armature operable to move through the longitudinal axis of the cavity in response to a current passing through the coil.

Next, block 1206 recites wherein the first channel and the second channel are located radially inward from the coil, and wherein the first channel is spaced apart from the second channel along the longitudinal axis by a ferrous spacer. Block 1208 then states wherein the first channel maintains one of a filler material or an air gap between an inner radial surface of the first magnetic ring and the outer radial surface of the first thin wall, and wherein the second channel maintains one of a filler material or an air gap between an inner radial surface of the second magnetic ring and the outer radial surface of the second thin wall. Following block 1208, block 1210 recites wherein first magnetic ring and the second magnetic ring each include an outer radial surface that is coextensive with the radial exterior surface of the ferromagnetic core tube. Block 1212 then states wherein the first magnetic ring circumscribes the first channel, and wherein the second magnetic ring circumscribes the second channel. Finally, block 1214 states wherein the inner radial surface of the first magnetic ring is one of coextensive or not coextensive along the longitudinal axis with an outer radial surface of the filler material in the first channel, and wherein the inner radial surface of the second magnetic ring is one of coextensive or not coextensive along the longitudinal axis with an outer radial surface of the filler material in the second channel.

Embodiments of the present disclosure include a solenoid assembly having a core tube having a pair of channels that circumscribe the radial exterior surface. The channels include either a filler material or an air gap radially inward from magnetic rings. The solenoid assembly is operable to create a directional magnetic force operable to move an armature located within the core tube through its longitudinal axis. Embodiments include a solenoid having a core tube 104 and a pair of channels 106, 108 that each have a thin wall section with no welded material. This allows embodiments of the core tube 104 to be able to withstand low internal pressures and the ability to create high magnetic forces. Embodiments of the thin wall section of channels 106, 108 create a barrier between the fluids within the core tube 104, which improves the chemical resistance along the radial interior surface of core tube 104. One of the advantages of having a pair of channels that each have a thin wall portion that is integral with the core tube is to aid in the elimination of leaks without sacrificing the strength of the magnetic forces created by the solenoid.

It is to be understood that any feature described in relation to any one embodiment may be used alone, or in combination with other features described, and may also be used alone, or in combination with one or more features of any other of the embodiments, or any combination of any other of the embodiments. The presently disclosed embodiments are therefore considered in all respects to be illustrative. Furthermore, equivalents and modifications not described above may also be employed without departing from the scope of this disclosure, which is defined in the accompanying claims.

The invention claimed is:

1. A solenoid assembly comprising:

a ferromagnetic core tube having a longitudinal axis, a radial exterior surface and a radial interior surface surrounding a cavity, the ferromagnetic core tube comprising a first channel and a second channel disposed on the radial exterior surface of the ferromagnetic core tube, the first channel and the second channel circumscribing the ferromagnetic core tube along a given portion of the longitudinal axis, wherein the first channel and the second channel are spaced from one another along the longitudinal axis, the first channel comprising a plurality of radial exterior surfaces, the second channel comprising a second plurality of radial exterior surfaces, wherein a first portion of the ferromagnetic core tube between the plurality of radial exterior surfaces of the first channel and the radial interior surface of the ferromagnetic core tube define a first thin wall portion of the ferromagnetic core tube, wherein a second portion of the ferromagnetic core tube between the second plurality of radial exterior surfaces of the second channel and the radial interior surface of the ferromagnetic core tube define a second thin wall portion of the ferromagnetic core tube, the first channel comprising a first magnetic ring radially spaced apart from the first thin wall, the second channel comprising a second magnetic ring radially spaced part from second thin wall; and a coil located radially outward of the ferromagnetic core tube, wherein the ferromagnetic core tube comprises a uniform single piece material.

2. The solenoid assembly according to claim 1, the solenoid assembly further comprising an armature maintained with the cavity, the armature operable to move through the longitudinal axis of the cavity in response to a current passing through the coil.

3. The solenoid assembly according to claim 1, wherein the first channel and the second channel are located radially inward from the coil.

4. The solenoid assembly according to claim 1, wherein the first channel is spaced apart from the second channel along the longitudinal axis.

5. The solenoid assembly according to claim 1, wherein the first channel maintains a non-magnetic filler material between an inner radial surface of the first magnetic ring and the outer radial surface of the first thin wall, and wherein the second channel maintains a non-magnetic filler material between an inner radial surface of the second magnetic ring and the outer radial surface of the second thin wall.

6. The solenoid assembly according to claim 5, wherein the inner radial surface of the first magnetic ring is coextensive along the longitudinal axis with an outer radial surface of the filler material in the first channel, and wherein the inner radial surface of the second magnetic ring is coextensive along the longitudinal axis with an outer radial surface of the filler material in the second channel.

7. The solenoid assembly according to claim 5, wherein the inner radial surface of the first magnetic ring is not coextensive along the longitudinal axis with an outer radial surface of the filler material in the first channel, and wherein the inner radial surface of the second magnetic ring is not coextensive along the longitudinal axis with an outer radial surface of the filler material in the second channel.

8. The solenoid assembly according to claim 1, wherein the first channel maintains a first air gap between an inner radial surface of the first magnetic ring and the outer radial surface of the first thin wall, and wherein the second channel maintains a second air gap between an inner radial surface of the second magnetic ring and the outer radial surface of the second thin wall.

9. The solenoid assembly according to claim 1, wherein first magnetic ring and the second magnetic ring each include an outer radial surface that is coextensive with the radial exterior surface of the ferromagnetic core tube.

10. The solenoid assembly according to claim 1, wherein the first magnetic ring circumscribes the first channel, and wherein the second magnetic ring circumscribes the second channel.

11. The solenoid assembly according to claim 1, wherein the ferromagnetic core tube comprises a Teflon coated sleeve located along the radial interior surface surrounding the cavity.

12. The solenoid assembly according to claim 1, wherein the first magnetic ring comprises a first plurality of C-shaped magnets, and wherein the second magnetic ring comprises a second plurality of C-shaped magnets.

13. A solenoid assembly comprising:

a ferromagnetic core tube having a longitudinal axis, a radial exterior surface and a radial interior surface surrounding a cavity, the ferromagnetic core tube comprising a first channel and a second channel disposed on the radial exterior surface of the ferromagnetic core tube, the first channel and the second channel circumscribing the ferromagnetic core tube along a given portion of the longitudinal axis, wherein the first channel and the second channel are spaced from one another along the longitudinal axis, the first channel comprising a plurality of radial exterior surfaces, the second channel comprising a second plurality of radial exterior surfaces, wherein a first portion of the ferromagnetic core tube between the plurality of radial exterior surfaces of the first channel and the radial interior surface of the ferromagnetic core tube define a first thin wall portion of the ferromagnetic core tube, wherein a second portion of the ferromagnetic core tube between the second plurality of radial exterior surfaces of the second channel and the radial interior surface of the ferromagnetic core tube define a second thin wall portion of the ferromagnetic core tube, the first channel comprising a first magnetic ring radially spaced apart from the first thin wall, the second channel comprising a second magnetic ring radially spaced part from second thin wall;

an armature maintained with the cavity, the armature operable to move through the longitudinal axis of the cavity in response to a current passing through the coil;

a coil located radially outward of the ferromagnetic core tube, wherein the ferromagnetic core tube comprises a uniform single piece material, wherein the first channel maintains a filler material between an inner radial surface of the first magnetic ring and the outer radial surface of the first thin wall, and wherein the second channel maintains a filler material between an inner radial surface of the second magnetic ring and the outer radial surface of the second thin wall.

14. A method comprising:

(a) providing a ferromagnetic core tube having a longitudinal axis, a radial exterior surface and a radial interior surface surrounding a cavity, the ferromagnetic core tube comprising a first channel and a second channel disposed on the radial exterior surface of the ferromagnetic core tube, the first channel and the second channel circumscribing the ferromagnetic core tube along a given portion of the longitudinal axis, wherein the first channel and the second channel are spaced from one another along the longitudinal axis, the first channel comprising a plurality of radial exterior surfaces, the second channel comprising a second plurality of radial exterior surfaces, wherein a first portion of the ferromagnetic core tube between the plurality of radial exterior surfaces of the first channel and the radial interior surface of the ferromagnetic core tube define a first thin wall portion of the ferromagnetic core tube, wherein a second portion of the ferromagnetic core tube between the second plurality of radial exterior surfaces of the second channel and the radial interior surface of the ferromagnetic core tube define a second thin wall portion of the ferromagnetic core tube, the first channel comprising a first magnetic ring radially spaced apart from the first thin wall, the second channel comprising a second magnetic ring radially spaced part from second thin wall; and (b) providing a coil located radially outward of the ferromagnetic core tube, wherein the ferromagnetic core tube comprises a uniform single piece material.

15. The method according to claim 14, wherein the first channel and the second channel are located radially inward from the coil, and wherein the first channel is spaced apart from the second channel along the longitudinal axis by a ferrous spacer.

16. The method according to claim 14, wherein the first channel maintains a non-magnetic filler material between an inner radial surface of the first magnetic ring and the outer radial surface of the first thin wall, and wherein the second channel maintains a non-magnetic filler material between an inner radial surface of the second magnetic ring and the outer radial surface of the second thin wall.

17. The method according to claim 14, wherein the first channel maintains a first air gap between an inner radial surface of the first magnetic ring and the outer radial surface of the first thin wall, and wherein the second channel maintains a second air gap between an inner radial surface of the second magnetic ring and the outer radial surface of the second thin wall.

18. The method according to claim 14, wherein the first magnetic ring circumscribes the first channel, and wherein the second magnetic ring circumscribes the second channel.

19. The method according to claim 14, wherein the first magnetic ring comprises a first plurality of curved magnets, and wherein the second magnetic ring comprises a second plurality of curved magnets.

* * * * *